Figure 2:
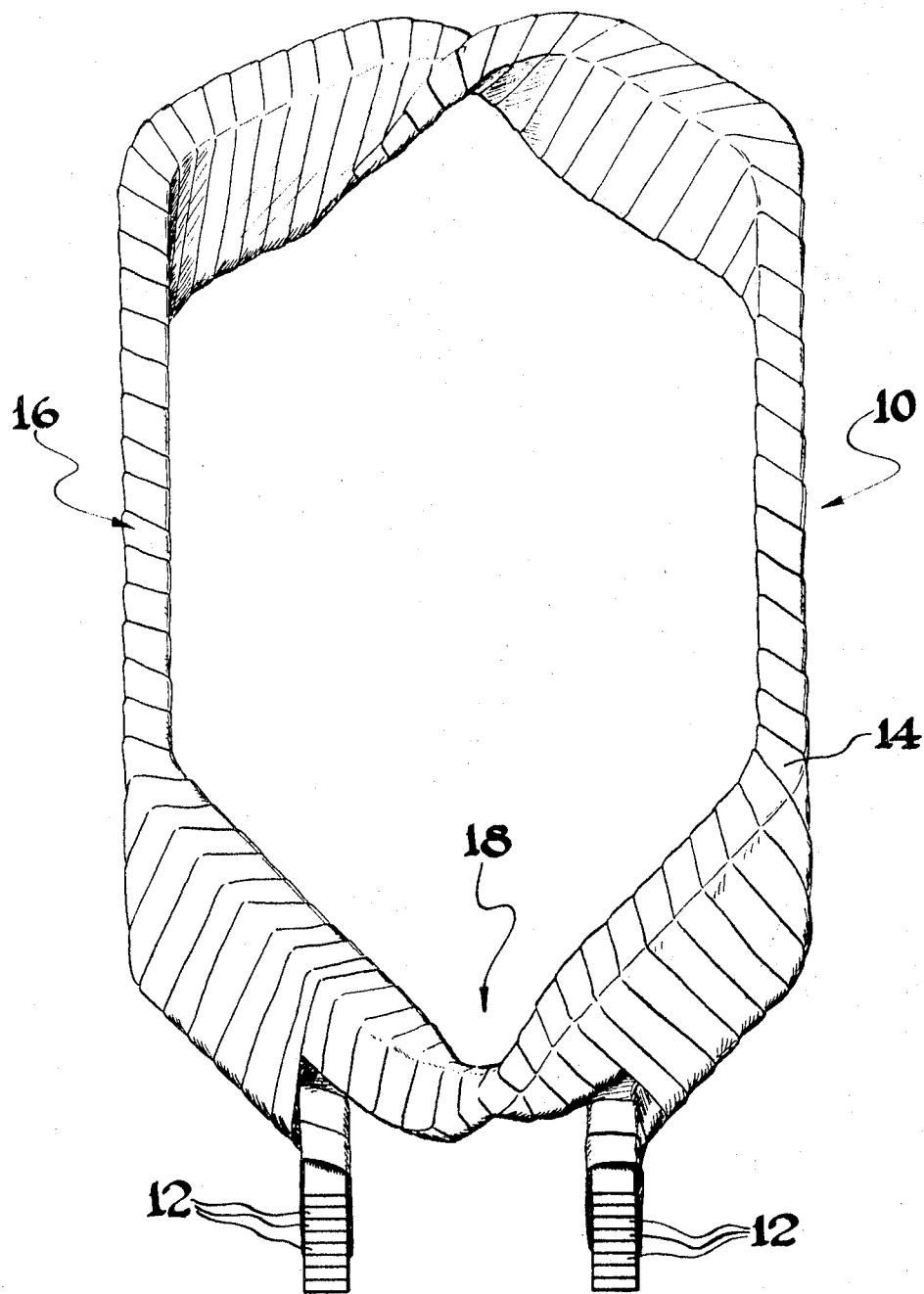

United States Patent [19]
Beddows

[11] 3,839,653
[45] Oct. 1, 1974

[54] FLEXIBLE LOOP, HARD SLOT COILS FOR DYNAMOELECTRIC MACHINE WINDINGS

[75] Inventor: Norman Anthony Beddows, Scotia, N.Y.

[73] Assignee: General Electric Company, Schenectady, N.Y.

[22] Filed: Apr. 12, 1973

[21] Appl. No.: 350,572

Related U.S. Application Data
[62] Division of Ser. No. 199,845, Nov. 18, 1971.

[52] U.S. Cl. ................................. 310/45, 310/208
[51] Int. Cl. .......................................... H02k 15/12
[58] Field of Search ......... 310/215, 208, 45, 42, 43, 310/200; 29/596; 156/53, 561, 305, 330; 174/120, 120 SR

[56] References Cited
UNITED STATES PATENTS

| | | | |
|---|---|---|---|
| 2,757,298 | 7/1956 | Botts | 310/208 |
| 2,921,207 | 1/1960 | Fletcher | 310/208 |
| 2,928,964 | 3/1960 | Jones | 310/208 |
| 2,975,088 | 3/1961 | Rossman | 310/208 |
| 3,079,519 | 2/1963 | Kitson | 310/45 |
| 3,164,888 | 1/1965 | Sharrow | 310/208 |
| 3,254,150 | 5/1966 | Rogers | 310/45 |
| 3,458,389 | 7/1969 | Mertens | 156/330 |
| 3,531,751 | 9/1970 | Sargent | 310/208 |
| 3,662,199 | 5/1972 | Anderson | 310/208 |
| 3,749,950 | 7/1973 | Lenz | 310/45 |

*Primary Examiner*—R. J. Skudy
*Attorney, Agent, or Firm*—Vale P. Myles

[57] ABSTRACT

A dynamoelectirc machine coil wound in a closed loop having elongated slot regions adapted for insertion into axially extending slots in a magnetic member of a dynamoelectric machine, and having end loop regions that interconnect the respective adjacent ends of the slot regions. The coil has a homogeneous insulating tape wrapped over its entire length with a compatible thermosetting insulating resin system impregnated in the tape. The resin system, and resultant coils, are characterized by having means for effecting a differential cure of the slot regions and the end loop regions of the coil thereby to fully cure the slot regions to a hard finish and partially cure the end loop regions so that they remain flexible to facilitate installation of the coils into the slots of a dynamoelectric machine magnetic member.

1 Claim, 5 Drawing Figures

Fig. 1

```
┌─────────────────────────────────┐
│ Wind conductors and shape       │
│ into coil configuration         │
└─────────────────────────────────┘
              │
┌─────────────────────────────────┐
│ Wrap coil with micaceous        │
│ electrical insulating tape      │
│ and simultaneously brush        │
│ a faster curing resin into      │
│ the slot regions of the coil    │
│ and a slower curing resin into  │
│ the loop regions of the coil    │
└─────────────────────────────────┘
              │
┌─────────────────────────────────┐
│ Apply release and shrinking     │
│ tapes and shape guides to entire│
│ coil and bake to completely cure│
│ slot regions and partially cure │
│ the loop regions                │
└─────────────────────────────────┘
              │
┌─────────────────────────────────┐
│ Remove release and shrinking    │
│ tapes and insert coil into      │
│ machine slots                   │
└─────────────────────────────────┘
```

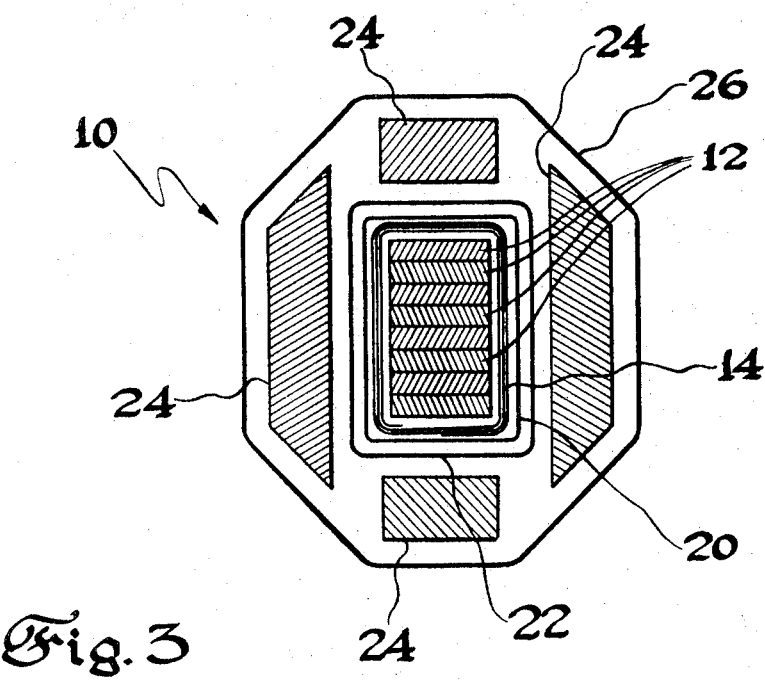
Fig. 3
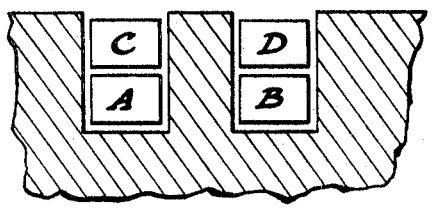 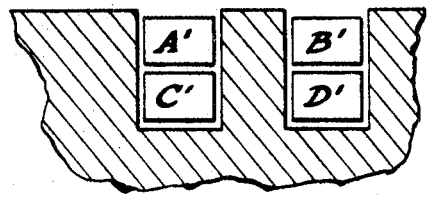
Fig. 4

Fig. 5

- Wind conductors and shape into coil configuration
- Wrap coil with micaceous electrical insulating tape and simultaneously brush a faster curing resin into the slot regions of the coil and a slower curing resin into the loop regions of the coil
- Apply release and shrinking tapes and shape guides to entire coil
- Place coil in vacuum to remove volatiles
- Pressurize coil in dry gaseous atmosphere, heat to shrink the heat shrinking tape and bake to completely cure the slot regions and partially cure the loop regions
- Remove release and shrinking tapes and insert coil into machine slots

FLEXIBLE LOOP, HARD SLOT COILS FOR DYNAMOELECTRIC MACHINE WINDINGS

This is a division of application Ser. No. 199,845 filed Nov. 18, 1971.

THE DISCLOSURE

This invention relates to pre-formed coils for dynamoelectric machines and to a method of fabricating machines utilizing the pre-formed coils. More particularly, the invention relates to a flexible loop, hard slot pre-formed coil having a resin system throughout the coil with differing cure rates in the slot and loop portions of the coil to facilitate insertion of the coils into a magnetizable machine member.

In winding the dynamoelectric machines with pre-formed coils, i.e., closed loop coils shaped into a desired configuration and insulated before insertion into the machine slots, it generally is necessary to lift previously inserted coil sides from machine slots to permit the sides of subsequently wound coils to be positioned therebelow. When the pre-formed coil is coated with a rigid insulation system, such as the commonly utilized epoxy resin insulation systems, raising of the coil side places mechanical stress on the coil insulation tending to produce cracks therein, On technique customarily employed to facilitate raising of coil sides from the slots is to heat the loops, or end turns, of the coil above the glass transition temperature of the insulating resin to soften the resin sufficiently to inhibit cracking due to physical distortion of the loops. While heat treatment of the loops facilitates raising of the coil sides, such treatment significantly increases the time required to wind a machine and can be deleterious to the coil insulation if the insulation undergoes a rapid heat rice in treatment.

An alternative method employed to facilitate winding of machines by completely eliminating the necessity for raising previously inserted coil sides is described in H.D. Snively's U.S. patent, now U.S. Pat. No. 3,631,278 and issue Dec. 28, 1971 assigned to the assignee of the instant application. This method, as described in the patent application, generally comprises the utilization of pre-formed coils offset in different directions to wind deep slot machines, i.e., machines having a group of slots having a depth at least one coil side deeper than the coil sides to be inserted therein. While dual offset coils are extremely advantageous in facilitating the winding of machines wherein excess slot depth is required for cooling purposes, such coils generally are not suitable in machines wherein the slot depth is substantially equal to the total depth of the conductor sides to be inserted therein.

It also has been suggested that pre-formed coils be wrapped with a resin impregnated micaceous tape along the slot sections of the coil and the loops be wrapped with a porous tape having a resin liquid brushed between successive layers of the tape to produce a hard slot, flexible loop coil for facilitating the raising of coil sides. Coil winding utilizing different tapes, however, requires scarfing, i.e., the extremely time consuming process of inter-winding non-homogeneous tapes, at the juncture of the tapes along the coil.

It is therefore an object of this invention to provide a flexible loop, hard slot coil which can be easily manufactured at reduced cost.

It is also an object of this invention to provide a coil having diverse flexibility characteristics along the coil length without need to scarf the taping applied to the coil.

It is a further object of this invention to provide a flexible loop, hard slot coil having a gradual transition in rigidity from the loop to the slot regions of the coil.

It is a still further object of this invention to provide a coil wherein extreme accuracy is not required in the geometric configuration of the coil.

It is a still further object of this invention to provide a method of manufacturing a dynamoelectric machine utilizing pre-formed coils having fully cured slot sections and partially cured loop sections to facilitate raising of the jump during machine winding and repair.

These and other objects of this invention generally are achieved by a pre-formed coil characterized by a plurality of conductors wound in a closed loop and shaped to a coil configuration characterized by elongated slot regions for insertion in axially extending cavities of a magnetic member of a dynamoelectric machine and loop regions interconnecting the ends of the slot regions. The entire length of the coil is wrapped with a homogeneous tape having a thermosetting insulating system impregnated therein. The portion of the insulating system impregnated within the tape wrapped atop the slot regions of the coil, however, is completely cured to a rigid mass while the portion of the insulating system impregnated within the tape wrapped atop the loop regions of the coil is only partially cured, i.e., cured to a non-tacky state, to provide a flexible loop, hard slot coil. Preferably, the differential cure in the coil is achieved by the differential addition of a cross-linking promoter to the resin impregnated within the tape wrapped about the coil although a differential degree of rigidity also can be achieved by changing the weight percentage of epoxy resins along the length of the coil when the thermosetting insulating resin system employed for the coil is a blend of a suitable promoter and two or more epoxide resins having different degrees of functionality and composition.

Although this invention is described with particularity in the appended claims, a more complete understanding of the invention may be obtained from the following detailed description of various specific embodiments taken in conjunction with the appended drawings wherein:

FIG. 1 is a flow chart illustrating in block diagram form a method of forming a flexible loop, hard slot coil in accordance with this invention, FIG. 2 is an isometric view of a coil formed in accordance with this invention, FIG. 3 is a sectional view of a hard slot, flexible loop coil during processing, FIG. 4 is a partial view of a dynamoelectric machine wound with the flexible loop, hard slot coils of this invention, and FIG. 5 is a flow chart illustrating in block diagram form a method of forming a flexible loop, hard slot coil having superior insulating characteristics.

Referring more particularly to FIGS. 1-3, a flexible loop, hard slot coil 10 in accordance with this invention is formed by initially winding a plurality of resin coated rectangular copper strands 12 into a closed loop whereafter the loop is shaped into a coil configuration utilizing a commercially available coil pulling machine. The entire coil then is wrapped with a porous micaceous tape 14 utilizing any conventional lap arrangement, typically ½ lap although other commonly utilized taping arrangements such as ¾ lap can be employed when increased resistance to damage by the transmittal of stress is desired. During lapping of the tape 14 atop coil 10, a single insulating resin system, such as a blend of Union Carbide's ERL 4221 and Emery Industries Inc. Dimer acid 1014 (an acid produced by the dimerization of C18 unsaturated fatty acids) in weight ratios of 0.8:1, 1:1, and 1:1.2, is applied between successive laps of the micaceous tape. In order to obtain a differential cure rate in slot region 16 relative to loop, or end turn, region 18 of the coil, a small quantity of a cross-linking promoter is added to the resin applied between laps of the tape wrapped about the slot region of the coil. For example, when the blend of ERL 4221 and 1014 in a 1:1 ratio is used as the insulating resin system, 1 percent by weight of tin(II)octoate typically would be added to the resin applied to the slot region of the coil to produce an accelerated cure of the slot region. After coil 10 is subsequently baked, e.g., at 150°C for 5 hours, to cure the insulation system, the slot regions of the coil are rigid and the loop regions are flexible. This facilitates raising the jump in a cold state. Prior to baking, coil 10 is characterized by a liquid resin coated tape wound about the entire length of the coil with the liquid resin in the tape atop the loop region of coil possessing a slower rate of reaction to heat than the liquid resin impregnated into the tape wrapped atop the slot region of the coil.

Although the resin applied to the loop portion of the coil normally will have no added cure promoter, hard slot, flexible loop coils also can be formed utilizing different concentrations of cure promoter along the coil to produce a more rapid cure of the insulating resin system applied to the slot regions of the coil relative to the cure rate of the resin along the loop regions of the coil. The difference in promoter concentration between the slot and loop regions of the coil, however, normally is small. For example, the weight ratio of the promoter to the resin in the loop regions generally should be not more than ½ percent while a maximum promoter concentration of less than 5 percent by weight of the insulating resin system typically is utilized in the slot regions of the coil.

The single insulating resin system utilized for the coil can vary dependent upon the electrical and physical characteristics desired for the coil. The insulating resin system, however, preferably is a thermosetting, non-solvent containing resin system exhibiting a gel time at room temperature of at least 10 hours, a low volatile content in both the cured and uncured states and a viscosity suitable for application by spraying or brushing. The insulating resin system also desirably should be non-toxic and have a cure temperature and time ranging between 24 hours at 100°C and two hours at 200°C.

Because there is some diffusion of the cure promoter at the changeover location in the coil due to the liquid states of the insulating resin systems applied to the loop and slot regions of the coil, the slower curing resin system should be applied to the loop region at least 1 inch, and normally 2–3 inches, from the end of the slot region of the coil to assure a complete cure throughout the entire slot region. If desired, the insulating resin systems can be color coded with a conventional oil based pigment to facilitate identification of the different resin systems along the coil. Typically, a commercially available two or three component automatic dispenser is employed to provide the resin, promoter and pigment in desired quantities and the mixture is applied between tape layers by manually brushing the insulating resin atop tape 14 as the tape is wrapped about coil 10. Because the insulating resin systems applied to the slot and loop regions of the coil are compatible, being formed of the same resin ingredients, a single continuous tape can be utilized for wrapping the entire coil. Moreover, because both insulating resin systems are present on the coil in the liquid state, some diffusion occurs prior to complete curing of the slot regions to inhibit a sharp transition at the junction of the hard slot to the flexible loop regions of the coil. The entire transition region, however, must be positioned beyond the slot regions of the coil to assure a thorough cure of the entire slot regions of the coil.

Although a differential cure rate in coil 10 preferably is achieved by utilization of differing concentrations of cure promoting catalyst in the slot regions relative to the loop regions of the coil, flexible loop, hard slot coils also can be obtained by varying the weight percentages of epoxy resins having different degrees of functionality and composition when the insulating resin systems coated between turns of the tape are formed of a blend of such resins. As is taught in Markovitz U.S. Pat. No. 3,776,978, issued Dec. 4, 1973, and assigned to the assignee of the present invention, the cure rate of an epoxy resin blend can be varied by altering the weight percentages of dual epoxy resins when the resins are mixed with a cure promoter comprising a titanate and a phenol in non-stoichiometric amounts. For example, a thermosetting resin prepared by mixing 90 parts by weight ERL 4221, 10 parts by weight Epon 828 (a bisphenol A-diglycidyl ether epoxy resin having an epoxide equivalent weight between 185 and 192), 1.0 parts by weight bisphenol A and 0.5 parts by weight Tyzor OG (a tetraoctylene glycol titanate containing 7.8 percent Ti) gels in 60 minutes when baked at 150°C while a gel time of 80 minutes at 150°C is required for equal concentrations of the epoxy resins utilizing the identical bisphenol A-Tyzor OG hardener, i.e., a thermosetting resin prepared by mixing 50 parts by weight ERL 4221, 50 parts by weight Epon 828, 1.0 parts by weight bisphenol A and 0.5 parts by weight Tyzor OG. Because the composition of the insulating resin systems is substantially identical along the complete length of the coil (except for a variation in the weight percentages of the epoxy resins or the addition of higher weight percentages of cure promoter in the slot regions of the coil), the insulating resin systems are compatible and can readily admix in a liquid state along the coil.

After wrapping of the coil with resin impregnated micaceous tape is complete, coil 10 is overwrapped with a release tape 20 such as ½ lap Tedlar (a product of the E.I. DuPont de Nemours & Company) release tape, and a heat shrinking tape 22, such as ½ lap Mylar (a product of the E.I. DuPont de Nemours & Company) tape. Loop forms and slot guides (the latter being identified by reference numeral 24 in FIG. 3), then are placed adjacent the coil and the entire structure is sequentially wrapped with layers of release tape and heat shrinking tape 26. Because the flexible nature of loop regions 18 in the finished coil permits adjustment of the clearance between coils during subsequent winding of the machine, extreme precision is not required in the angle of the coil drop. The entire structure next is heated for a period required to compress the insulation upon the coil, e.g., 150°C for ½ hour to pull down the Mylar heat shrinking tape, whereafter the coil is baked, e.g., at 150°C for 6 hours, until the insulating resin system applied to the loop regions is cured sufficiently to accept an application of voltage gradient point normally utilized as a coating for high voltage insulation. Because of the more rapid cure rate of the slot sections of the coil due to the added cure promoter (or variation in the weight percentage of epoxy resins forming the insulating resin system) a complete cross-linking of the resin system applied to the slot region of the coil preferably also is achieved. The heat shrinking and release tapes, as well as the loop forms and slot guides, then are removed from the coil and the entire coil is painted with a voltage grading paint having sufficient flexibility to permit raising of previously inserted coil sides during winding of the machine. Alternatively, a suitably impregnated asbestos grading tape could be applied to the coil rather than voltage grading paint. Because the loops of the coil are flexible in a cold state due to the partial cure of the insulating resin system coated therein, there is no need to heat the loops above the glass transition temperature of the insulation during insertion of the winding into a machine. Thus, in winding a machine, as is illustrated in FIG. 4, coil sides A and B would be placed in the radially inner coil side positions of slots 28 and 30 while the other sides A' and B' of coils A and B, respectively, would be positioned in the radially outer coil side positions of slots 32 and 34 situated one pole pitch (or a fraction of a pole pitch when a fractional pitch, e.g., 5/6 pitch, winding is used) away from slots 28 and 30. When coil sides C and D are subsequently placed in the outer coil side positions of slots 28 and 30, coil sides A' and B' must be raised to permit positioning of coils sides C' and D' in the radially inner coil side positions of slots 32 and 34. Raising of the coil sides A' and B', however, can readily be accomplished in the cold state because of the incomplete cure of the insulating resin system on the loop regions of the coils. After winding of the machine is complete, the loop regions are tied into position in conventional fashion to inhibit displacement of the coils during machine operation. If desired, a complete cure of the loop regions can be effected after tying the loop regions into position to further inhibit displacement of the coils by the electrical and mechanical forces acting thereon.

When superior insulating qualities are desired by virtue of a reduced void concentration in the insulation, the coil can be vacuum and pressure processed, prior to application of heat to cause shrinkage of the heat shrinking tapes applied to the coil, as illustrated in the flow chart of FIG. 5. Typically, the vacuum/pressure treatment is accomplished by placing the wrapped coil in a pressure vessel and applying a vacuum of ½ mm Hg abs for 5 hours, to remove volatiles within the insulation whereafter the coil is pressurized and heated. Typically, a pressure cycle of 80 psi for 5 hours in a dry gaseous atmosphere with heating to shrink the Mylar tape and cure the resin is employed. During the higher pressure treatment, the coil temperature is raised in excess of 100°C to initially shrink the tapes upon the coil followed by a further raise in temperature to subsequently fully cure the slot regions of the coil in accordance with the procedures heretofore described relative to FIGS. 1–3.

One coil prepared in accordance with this invention utilized a single micaceous tape applied tightly to the coil by hand taping and the last layer of tape was adhered by means of the epoxy resin with the resin applied to the slot regions of the coil containing additionally 1 percent by weight tin(II)octoate. A continuous layer of one mil Tedlar release tape, followed by one layer of ½ lap, one mil Mylar heat shrinking tape then was wrapped atop the resin impregnated micaceow tape whereafter slot guides and compression aids were affixed to the coil by successive layers of Tedlar release tape and Mylar heat shrinking tape, with clamps being employed to insure a tight initial application of the slot guards to the slot sections of the coil. The coil then was baked at 130°C for six hours whereafter all the release and compression tapes were stripped from the coil. The coil exterior next was painted with a voltage grading paint and the coil was baked at 127°C for 2 hours to harden the paint. An air drying alkyd varnish then was spray coated atop the coil to improve the appearance of the coil surface. The finished coil exhibited good flexibility in the loop sections and good rigidity in the slot section.

What I claim as new and desire to secure by letters patent of the United States is:

1. A pre-formed coil for a dynamoelectric machine comprising a plurality of conductors wound in a closed loop and shaped to a coil characterized by elongated slot regions for insertion in axially extending cavities of a magnetic member of a dynamoelectric machine and loop regions interconnecting the ends of said slot regions, said entire length of the coil being wrapped with a homogeneous tape having a compatible thermosetting insulating resin system impregnated therein, the portion of said insulating resin system impregnated within the tape wrapped atop said slot regions of said coil being fully cured to a rigid structure and the portion of the insulating resin system applied to the tape wrapped atop the loop regions of said coil being only partially cured to a gel state to provide a hard slot, flexible loop coil, said thermosetting insulating system comprising two or more resins having different degrees of functionality and composition, the weight percentages of the resins applied to the slot regions of the coil varying relative to the weight percentages of the same resins in the loop regions of the coil to produce a complete cure of the resin system in the slot regions of the coil and a partial cure in the resin system applied to the loop regions of the coil.

* * * * *